United States Patent
Yanagida et al.

(10) Patent No.: US 10,578,216 B2
(45) Date of Patent: Mar. 3, 2020

(54) VALVE DEVICE

(71) Applicant: DENSO CORPORATION, Kariya, Aichi-pref. (JP)

(72) Inventors: Etsugo Yanagida, Kariya (JP); Masashi Yamaguchi, Karia (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/510,019

(22) PCT Filed: Sep. 4, 2015

(86) PCT No.: PCT/JP2015/004491
§ 371 (c)(1),
(2) Date: Mar. 9, 2017

(87) PCT Pub. No.: WO2016/038860
PCT Pub. Date: Mar. 17, 2016

(65) Prior Publication Data
US 2017/0261109 A1 Sep. 14, 2017

(30) Foreign Application Priority Data

Sep. 12, 2014 (JP) .................. 2014-186804
Jul. 31, 2015 (JP) .................. 2015-152581

(51) Int. Cl.
*F16K 1/20* (2006.01)
*F01D 17/14* (2006.01)
(Continued)

(52) U.S. Cl.
CPC .......... *F16K 1/2014* (2013.01); *F01D 9/026* (2013.01); *F01D 17/105* (2013.01);
(Continued)

(58) Field of Classification Search
CPC .... F16K 1/2007; F16K 1/1024; F16K 1/2042; F01D 17/105; F01D 17/145; F02B 37/186; F02B 37/183
(Continued)

(56) References Cited

U.S. PATENT DOCUMENTS 3,543,789 A * 12/1970 Wheatley ................ F16L 55/46
137/544
4,719,757 A 1/1988 Nakazawa et al.
(Continued)

FOREIGN PATENT DOCUMENTS

CN 103912318 7/2014
DE 44 39 432 11/1995
(Continued)

*Primary Examiner* — Seth W. Mackay-Smith
(74) *Attorney, Agent, or Firm* — Nixon & Vanderhye PC

(57) ABSTRACT

A valve body includes an arm inserted portion that accommodates a part of a valve arm. A relation of hx<h1 is satisfied, provided that: a surface of the valve body that is in contact with a valve seat when an opening/closing valve closes a passing hole is a sealing surface; the valve arm and the opening/closing valve are in contact with each other on a contact surface when the opening/closing valve closes the passing hole; a surface of the contact surface that is the closest to the sealing surface is a valve-closed contact surface; hx is a size of thickness from the sealing surface to the valve-closed contact surface; and h1 is a size of thickness of the valve body.

24 Claims, 10 Drawing Sheets

(51) Int. Cl.
*F02B 37/18* (2006.01)
*F01D 9/02* (2006.01)
*F01D 17/10* (2006.01)

(52) U.S. Cl.
CPC .......... *F01D 17/145* (2013.01); *F02B 37/183* (2013.01); *F16K 1/2007* (2013.01); *F16K 1/2042* (2013.01); *F02B 37/186* (2013.01); *F05D 2220/40* (2013.01); *F05D 2260/606* (2013.01); *Y02T 10/144* (2013.01)

(58) Field of Classification Search
USPC ........................................ 137/861, 876, 883
See application file for complete search history.

(56) References Cited

U.S. PATENT DOCUMENTS

| | | | | |
|---|---|---|---|---|
| 4,730,456 A | * | 3/1988 | Tadokoro | F01D 17/18 251/298 |
| 9,151,218 B2 | * | 10/2015 | Ebisu | F02B 37/025 |
| 9,726,074 B2 | * | 8/2017 | Onitsuka | F02B 37/183 |
| 9,856,787 B2 | * | 1/2018 | Chu | F02B 37/225 |
| 9,869,238 B2 | * | 1/2018 | Stilgenbauer | F02B 37/183 |
| 9,885,278 B2 | * | 2/2018 | Dilalan | F02B 37/186 |
| 2009/0014674 A1 | * | 1/2009 | Grissom | F01D 17/145 251/298 |
| 2012/0060494 A1 | * | 3/2012 | Sato | F02B 37/025 60/602 |
| 2012/0292547 A1 | * | 11/2012 | Kierat | F02B 37/18 251/231 |
| 2012/0312010 A1 | | 12/2012 | Yasoshima | |
| 2013/0199175 A1 | * | 8/2013 | Hoshi | F01D 17/105 60/602 |
| 2013/0309106 A1 | * | 11/2013 | Yanagida | F02B 37/183 417/406 |
| 2014/0072410 A1 | * | 3/2014 | Marques | F16K 1/2014 415/144 |
| 2014/0072411 A1 | | 3/2014 | Marques et al. | |
| 2014/0072412 A1 | | 3/2014 | Marques et al. | |
| 2014/0130496 A1 | * | 5/2014 | Honma | F02B 37/013 60/612 |
| 2014/0174077 A1 | | 6/2014 | Palaniyappan et al. | |
| 2014/0290242 A1 | | 10/2014 | Isogai | |
| 2015/0292395 A1 | * | 10/2015 | Dilalan | F16K 1/20 60/602 |
| 2016/0084153 A1 | | 3/2016 | Marques et al. | |
| 2017/0204782 A1 | | 7/2017 | Marques et al. | |
| 2018/0298812 A1 | | 10/2018 | Palaniyappan et al. | |

FOREIGN PATENT DOCUMENTS

| | | |
|---|---|---|
| DE | 10 2009 007 574 | 8/2010 |
| DE | 10 2012 002 834 | 8/2013 |
| DE | 10 2013 214 665 | 1/2015 |
| JP | S62-131923 | 6/1987 |
| JP | 2013-204495 | 10/2013 |
| JP | 2013-213565 | 10/2013 |
| JP | 2015-78660 | 4/2015 |
| JP | 2015-175346 | 10/2015 |

* cited by examiner

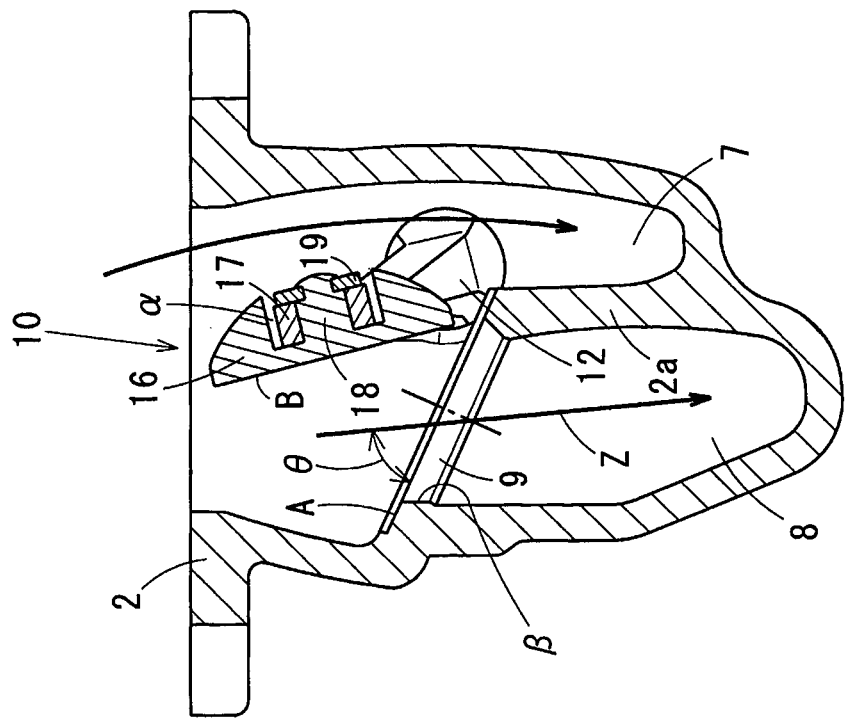
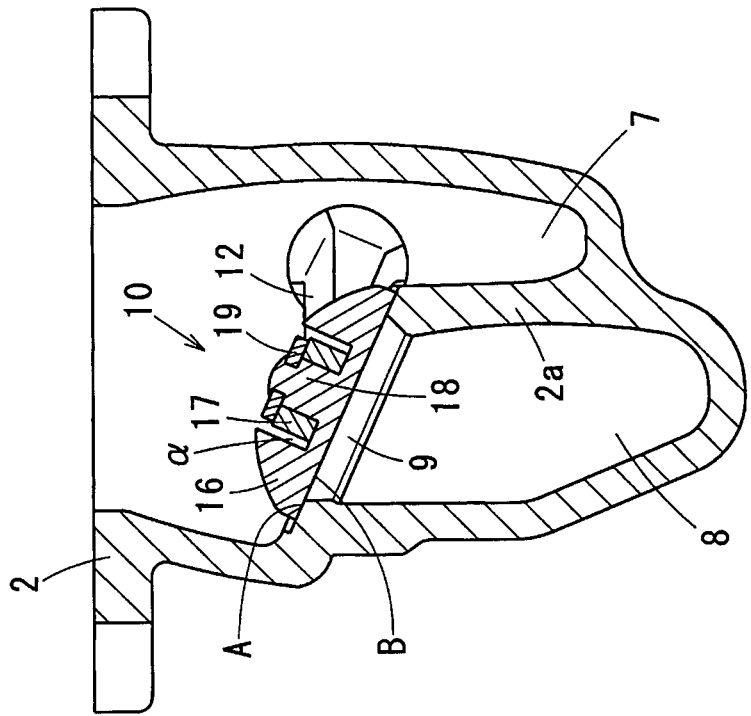

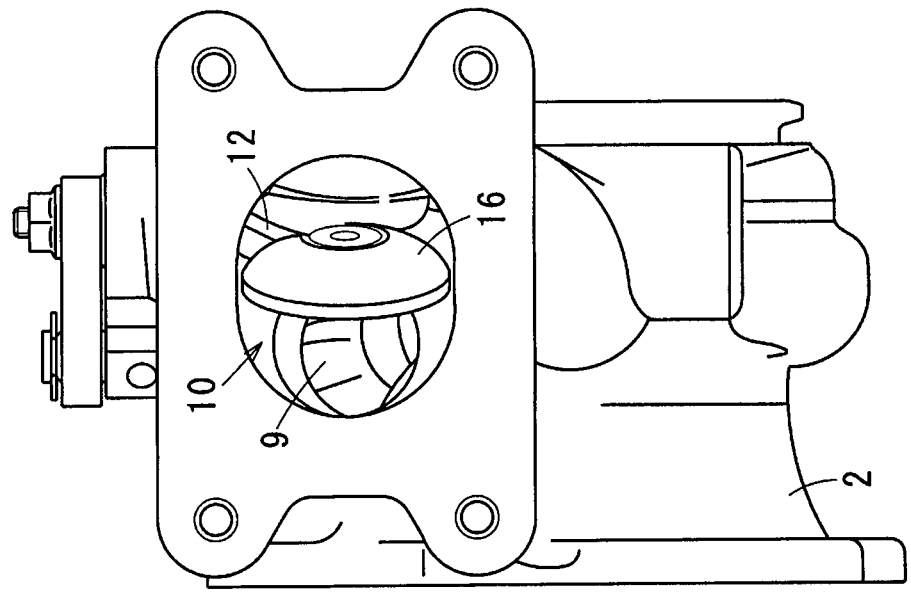
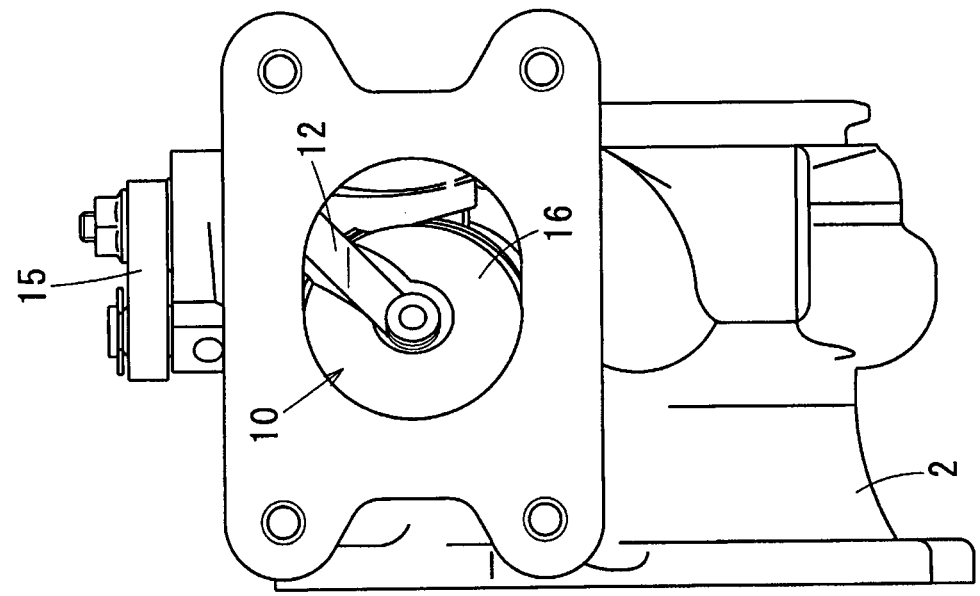

VALVE DEVICE

CROSS REFERENCE TO RELATED APPLICATIONS

This application is the U.S. national phase of International Application No. PCT/JP2015/004491 filed 4 Sep. 2015, which designated the U.S. and claims priority to JP Patent Application Nos. 2014-186804 filed 12 Sep. 2014, and 2015-152581 filed 31 Jul. 2015, the entire contents of each of which are hereby incorporated by reference.

TECHNICAL FIELD

The present disclosure relates to a valve device that opens or closes a passing hole of an exhaust gas and, for example, to a technique suitably used for a turbocharger. In the following, for convenience of description, a description will be made on the assumption that a turning direction in which an opening/closing valve in a closed state is opened is referred to as "an up direction" and that a direction opposite to the turning direction is referred to as "a down direction", but the up and down direction does not mean a vertical direction.

BACKGROUND ART

A prior art will be described below. An example of a valve device which is turned by an arm will be described with reference to FIG. 7B. In this regard, in the prior art, a same part as a functional part in embodiments to be described later will be denoted by a same reference character. In a valve device shown in FIG. 7B, an opening/closing valve 13 is supported by a tip of a valve arm 12 which is turned. The opening/closing valve 13 is a valve in which a valve body 16, which is formed in a shape of a nearly circular plate, is integrated with a valve-side combined part 18, which is a supported by the valve arm 12. The valve-side combined part 18 is formed in a shape of a shaft shaped like a circular column.

Issues of the prior art will be described below. A height dimension H of the opening/closing valve 13 is made a dimension obtained by adding a height dimension h2 of the valve-side combined part 18 to a thickness dimension h1 of the valve body 16. The height dimension H of the opening/closing valve 13 is required to be shortened for the purpose of reducing a size of the valve device and reducing a pressure loss or the like when the opening/closing valve 13 is opened. In other words, the thickness dimension h1 of the valve body 16 is required to be thinned and the height dimension h2 of the valve-side combined part 18 is required to be shortened.

However, when the opening/closing valve 13 is closed, a valve closing load is applied to a center of the valve body 16, so that a stress is caused in the valve body 16 in a direction in which an outer peripheral side of the valve body 16 is warped. For this reason, in order to secure a strength of the valve body 16, it is difficult to thin the valve body 16. In other words, in a two-step structure in which "the height dimension h2 of the valve-side combined part 18" is added to "the thickness dimension h1 of the valve body 16", it is difficult to shorten the height dimension H of the opening/closing valve 13, so that it is impossible to reduce the height dimension of the opening/closing valve and to increase the strength of the valve body at the same time.

PRIOR ART DOCUMENT

Patent Document

Patent Document 1: JP 2013-204495A

SUMMARY OF INVENTION

The present disclosure addresses the above issues. Thus, it is an objective of the present disclosure to provide a valve device capable of flattening an opening/closing valve and strengthening a valve body at the same time.

In order to achieve the objective, a valve device of one aspect of the present disclosure receives a portion of an arm in an arm inserted portion formed in a valve body, thereby overlapping a thickness dimension of the valve body and a height dimension of a valve-side combined part in an up and down direction. In this way, even if "the thickness dimension of the valve body" is made large for the purpose of strengthening the valve body, "the height dimension of an opening/closing valve" can be shortened. In other words, according to the present aspect, it is possible to flatten the opening/closing valve and to strengthen the valve body at the same time.

BRIEF DESCRIPTION OF DRAWINGS

The above and other objects, features, and advantages of the present disclosure will become more apparent from the following detailed description made with reference to the accompanying drawings. In the drawings:

FIG. 2A is a section view of a turbine housing to show a state in which a flow passage switching valve of the first embodiment is closed;

FIG. 2B is a section view of a turbine housing to show a state in which a flow passage switching valve of the first embodiment is opened;

FIG. 3A is a view when the turbine housing is viewed from an inlet side of exhaust gas to show the state in which the flow passage switching valve of the first embodiment is closed;

FIG. 3B is a view when the turbine housing is viewed from the inlet side of exhaust gas to show the state in which the flow passage switching valve of the first embodiment is opened;

EMBODIMENTS FOR CARRYING OUT INVENTION

Figure 1:
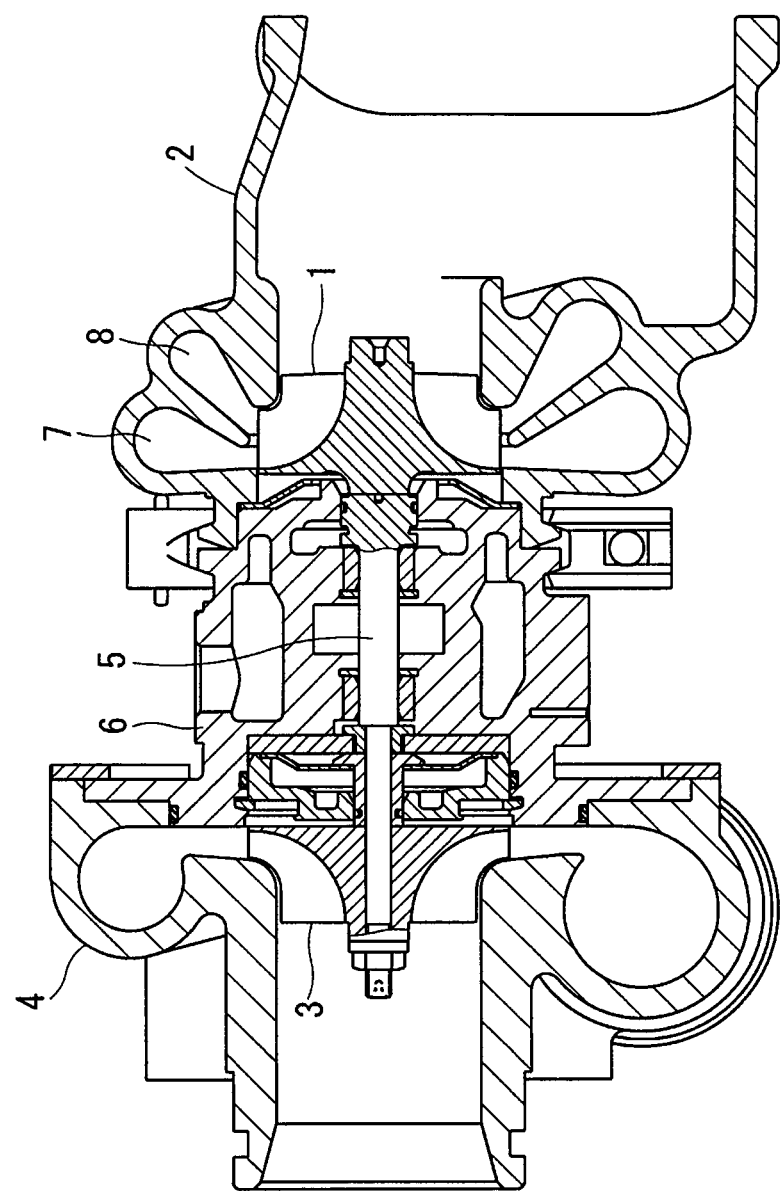
FIG. 1 is a section view of a turbocharger of a first embodiment.

Embodiments will be described below in detail on the basis of the drawings.

Embodiments in which the present disclosure is applied to a turbocharger will be described. In this regard, the embodiments disclosed below disclose specific examples and it is needless to say that the present disclosure is not limited to the embodiments.

First Embodiment

A first embodiment will be described with reference to FIG. 1 to FIG. 8. The turbocharger is mounted in an engine for running a vehicle.

The turbocharger is a supercharger that pressurizes an intake air sucked into an engine by an energy of an exhaust gas exhausted from the engine. The turbocharger is provided with a turbine impeller 1, which is rotated and driven by the exhaust gas exhausted from the engine, and a turbine housing 2, which houses the turbine impeller 1 and is formed in a shape of a swirl. Further, the turbocharger is provided with a compressor impeller 3, which is driven by a rotating force of the turbine impeller 1 to thereby pressurize the intake air in an intake air passage, and a compressor housing 4, which houses the compressor impeller 3 and is formed in a shape of a swirl. Still further, the turbocharger is provided with a shaft 5, which transmits a rotation of the turbine impeller 1 to the compressor impeller 3, and a center housing 6, which supports the shaft 5 in such a way that the shaft 5 can rotate freely at a high speed.

The turbocharger is constructed in such a way that the turbine housing 2, the compressor housing 4, and the center housing 6 are combined with each other in an axial direction by the use of a combining means such as a V band, a snap ring, and a bolt. In the turbine housing 2 are independently provided a first exhaust scroll 7 and a second exhaust scroll 8 which blow the exhaust gas to the turbine impeller 1.

The first exhaust scroll 7 has a ring-shaped exhaust outlet which swirls the exhaust gas exhausted from the engine and which blows the swirled exhaust gas to an exhaust upstream portion of the turbine impeller 1. The second exhaust scroll 8 has a ring-shaped exhaust outlet which swirls the exhaust gas exhausted from the engine in the same direction as the first exhaust scroll 7 and which blows the swirled exhaust gas to a middle portion of the turbine impeller 1.

The exhaust upstream portion of the first exhaust scroll 7 always communicates with an exhaust inlet of the turbine housing 2 and the exhaust gas is always supplied to the first exhaust scroll 7. On the other hand, an exhaust upstream portion of the second exhaust scroll 8 communicates with an exhaust gas upstream area of the first exhaust scroll 7 via a flow passage switching hole 9 formed in the turbine housing 2. The flow passage switching hole 9 is opened or closed by a flow passage switching valve 10.

The flow passage switching valve 10, as shown in FIG. 2, is turned in the turbine housing 2 and in a space formed at a position in which the exhaust gas of the first exhaust scroll 7 and the exhaust gas of the second exhaust scroll 8 are separated from each other. Then, the flow passage switching valve 10 opens or closes the flow passage switching hole 9 and regulates an opening of the flow passage switching hole 9 to thereby control an exhaust gas quantity to be supplied to the second exhaust scroll 8.

Specifically, when the flow passage switching valve 10 closes the flow passage switching hole 9, a small quantity of the exhaust gas is achieved, whereas when the flow passage switching valve 10 opens the flow passage switching hole 9, a large quantity of the exhaust gas is achieved.

The flow passage switching valve 10 has its action controlled by a control device via an actuator. The control device calculates a target intake air quantity from an operating state of the engine (for example, an engine revolution speed and an accelerator opening) and calculates a target boost pressure from the calculated target intake air quantity. Then, the control device calculates a target opening of the flow passage switching valve 10 from a relationship between the calculated target boost pressure and the engine revolution speed and controls the flow passage switching valve 10 in such a way as to achieve the calculated target opening.

Next, a specific example of the flow passage switching valve 10 will be described. In this regard, the flow passage switching hole 9 is an example of a passing hole and the flow passage switching valve 10 is an example of a valve device. The flow passage switching valve 10 is provided with a turning shaft 11 which is turned and operated from the outside of the turbine housing 2, a valve arm 12 which is turned integrally with the turning shaft 11, and an opening/closing arm 13 which is combined with a tip of the valve arm 12.

Figure 4:
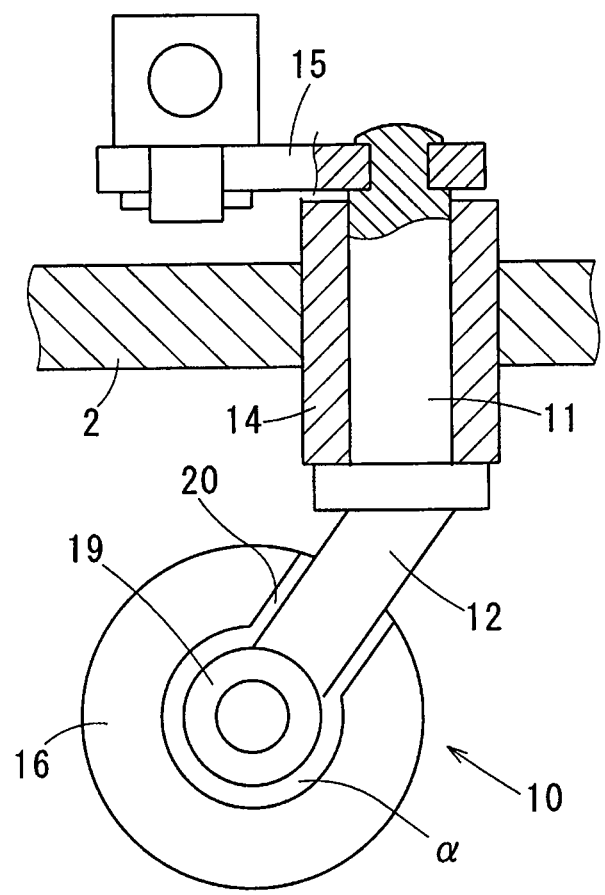
FIG. 4 is a figure to illustrate the flow passage switching valve supported by the turbine housing of the first embodiment.

The turning shaft 11, as shown in FIG. 4, is supported in such a way as to be freely turned via a bearing 14 supported by the turbine housing 2. The turning shaft 11 is turned and operated by an actuator via an external arm 15 combined with an outside portion of the turbine housing 2. The external arm 15 is fixed to the outside of the turbine housing 2 in the turning shaft 11. The external arm 15 is a member extended to the outside in a radial direction from a turning center of the turning shaft 11. When the external arm 15 is turned and operated by the actuator, the turning shaft 11 is turned.

The valve arm 12 is integrally provided on the inside of the turbine housing 2 in the turning shaft 11. The valve arm 12 is a turning arm extended to the outside in the radial direction from the turning center of the turning shaft 11. Then, when the turning shaft 11 is turned, the opening/closing valve 13 supported by the tip of the valve arm 12 is turned in such a way as to draw a circular arc.

The opening/closing valve 13 is combined with the tip of the valve arm 12. Then, when the valve arm 12 is turned, the opening/closing valve 13 is turned to thereby open/close the flow passage switching hole 9. The opening/closing valve 13 is provided with a valve body 16, which is seated on a valve seat A around the flow passage switching hole 9 when the opening/closing valve 13 is closed to thereby close the flow passage switching hole 9 and which is formed in a shape of a nearly circular plate, and a valve-side combined part 18 which is supported by the valve arm 12 in the opening/closing valve 13.

The valve seat A is formed by the turbine housing 2 and is a flat part formed around the flow passage switching hole 9. The valve-side combined part 18 is a part that is combined with an arm-side combined part 17, which will be described later, and that is supported by the valve arm 12. On the other hand, the valve arm 12 is provided with the arm-side combined part 17 which supports the opening/closing valve 13. The arm-side combined part 17 is combined with the valve-side combined part 18 to thereby support the opening/closing valve 13.

Here, in a position in which the valve arm 12 and the opening/closing valve 13 are coupled with each other and which is exposed to the exhaust gas of high temperature is provided a clearance to absorb a difference in thermal expansion between the valve arm 12 and the opening/closing valve 13. Specifically, between the arm-side combined part 17 provided on the tip of the valve arm 12 and the valve-side combined part 18 provided in the central portion of the opening/closing valve 13 is provided a clearance to allow the opening/closing valve 13 to move and incline by a predetermined quantity with respect to the valve arm 12.

A combining structure of the arm-side combined part 17 and the valve-side combined part 18 is not limited to a special structure but an example of the combining structure will be disclosed for the purpose of assisting to understand the combining structure. The valve-side combined part 18 is formed in a shape of a shaft shaped like a circular column protruded upward from a central portion of the valve body 16. On the other hand, the arm-side combined part 17 is formed in a shape of a circular cylinder fitted on an outer periphery of the valve-side combined part 18 formed in the shape of the shaft. In this regard, in this first embodiment, the valve body 16 formed in the shape of the nearly circular plate and the valve-side combined part 18 formed in the shape of the shaft are integrated with each other.

The valve-side combined part 18 has a washer 19 coupled with a top thereof, the washer 19 being formed in a shape of a circular plate shaped like a ring and inhibiting the arm-side combined part 17 from coming off. As a means for coupling the valve-side combined part 18 with the washer 19 can be employed various techniques such as a welding technique and a swaging technique, and the means is not limited to a special technique but the swaging technique is employed as a specific example.

In a top end of the valve-side combined part 18 is formed a protruding shaft 18a which is inserted into the washer 19 and which has a small diameter. When the protruding shaft 18a is inserted into the washer 19 and a tip end portion of the protruding shaft 18a is swaged, the washer 19 is coupled with the valve-side combined part 18, whereby the arm-side combined part 17 is combined with the valve-side combined part 18. In this regard, a swaged portion 18b is protruded upward from a top surface of the washer 19 but is formed in a flat spherical shape, thereby being formed in such a way that the exhaust gas can flow smoothly without resistance as far as possible.

In the following description, a thickness dimension of the valve body 16 is assumed to be h1 and a shaft size of the valve-side combined part 18 is assumed to be h2. Of the valve body 16, a face which is put into contact with the valve seat A when the opening/closing valve 13 is closed is assumed to be a sealing surface B. Of a contact face in which the valve arm 12 and the opening/closing valve 13 are put into contact with each other when the opening/closing valve 13 is closed, a face closest to the sealing surface B is assumed to be a valve-closed contact surface C. A thickness dimension from the sealing surface B to the valve-closed contact surface C is assumed to be hx.

The valve body 16 has an arm inserted portion α formed in a top face thereof, the arm inserted portion α receiving a portion of the arm 12. Specifically, the arm inserted portion α is formed in such a way as to have a portion or all of the arm-side combined part 17 received and arranged in the inside thereof. In other words, the valve body 16 has the arm inserted portion α formed therein in such a way as to make a thickness dimension h1 of the valve body 16 overlap a height dimension h2 of the valve-side combined part 18 in an up and down direction by the arm inserted portion α to thereby satisfy a relational expression of "hx<h1". Since the valve body 16 has the arm inserted portion α formed therein in this way, the thickness dimension hx is made smaller than the thickness dimension h1 of the valve body 16.

Here, a shape of the arm inserted portion α formed in the valve body 16 is not limited to a special shape but depends on a combining structure of the arm-side combined part 17 and the valve-side combined part 18. Specifically, the arm inserted portion α of the first embodiment receives the arm-side combined part 17, which is formed in the shape of the circular cylinder, via a clearance and employs a groove shape which opens upward and which is shaped like a ring. In this regard, a means for forming the arm inserted portion α and an arm groove 20, which will be described later, in the valve body 16 made of a refractory metal (for example, alloy containing a Ni group) is not limited to a special means but various kinds of techniques such as a forging technique by clod forging and a cutting technique can be employed.

An effect 1 of the first embodiment will be described in the following. The flow passage switching valve 10 of the first embodiment, as described above, has the arm inserted portion α formed in the top face of the valve body 16 in such a way to satisfy the relational expression of "hx<h1", the arm inserted portion α receiving and arranging the arm-side combined part 17. In other words, the thickness dimension h1 of the valve body 16 is made to overlap the height dimension h2 of the valve-side combined part 18 in the up and down direction by the use of the arm inserted portion α. For this reason, even when "the thickness dimension h1 of the valve body" is made large in order to strengthen the valve body 16, "the height dimension H of the opening/closing valve 13" can be shortened. In this way, it is possible to strengthen the valve body 16 and to flatten the opening/closing valve 13 at the same time.

Further, since the opening/closing valve 13 is flattened, when the flow passage switching valve 10 is opened, as shown in FIG. 2B, a projected area of the opening/closing valve 13 when viewed from a flow direction (as an example, an exhaust upstream side) of the exhaust gas can be made small. For this reason, a pressure loss of an exhaust gas flow directed to each of the first exhaust scroll 7 and the second exhaust scroll 8 can be reduced.

In particular, the flow passage switching valve 10 of the first embodiment has the opening/closing valve 13 turned and operated on the exhaust upstream side of the opening/closing hole 9. Then, the flow passage switching valve 10 has the opening/closing valve 13 provided therein in such a way that when the flow passage switching valve 10 is fully opened, as shown in FIG. 2B, a partition wall 2a, which partitions the first exhaust scroll 7 from the second exhaust scroll 8, and the flattened opening/closing valve 13 are arranged in a line along a flow direction of the exhaust gas. For this reason, when the flow passage switching valve 10 is fully opened, a flow passage resistance can be made extremely small, so that the pressure loss of the exhaust gas flow directed to each of the first exhaust scroll 7 and the second exhaust scroll 8 can be made extremely small.

An effect 2 of the first embodiment will be described below. The first exhaust scroll 7 corresponds to a constantly-open passage and the second exhaust scroll 8 corresponds to an opening/closing passage. The second exhaust scroll 8, as described above, is arranged side by side with the first exhaust scroll 7. In other words, the first exhaust scroll 7 and the second exhaust scroll 8 are arranged in parallel to each other. Then, when the opening/closing valve 13 closes the flow passage switching hole 9, the exhaust gas flows into only the first exhaust scroll 7. Further, when the opening/closing valve 13 opens the flow passage switching hole 9, the exhaust gas flows into both of the first exhaust scroll 7 and the second exhaust scroll 8.

The flow passage switching valve 10 of the first embodiment, as described above, is a valve of an inward opening type in which when the opening/closing valve 13 is moved to the exhaust upstream side of the valve seat A, the opening/closing valve 13 is opened. In the following description, a flow direction of the exhaust gas flowing in the second exhaust scroll 8 which is opened or closed by the flow passage switching valve 10 is assumed to be a flow velocity direction Z. Specifically, as shown in FIG. 2B, a flow direction of the exhaust gas, which passes through nearly the center of the flow passage switching hole 9 and flows to a flow passage center of the second exhaust scroll 8 when an opening angle of the opening/closing valve 13 is maximum, is assumed to be a flow velocity direction Z.

In the first embodiment, the valve seat A is provided at a slant with respect to the flow velocity direction Z. Specifically, as shown in FIG. 2B, the valve seat A is slanted in such a way that "the valve seat A on a side remote from the turning shaft 11" is arranged on the exhaust upstream side as compared with "the valve seat A on a side close to the turning shaft 11".

Since the valve seat A is provided in this way, even if the flow passage switching valve 10 is opened by a small opening, a projected area of the opening/closing valve 13 when viewed from the flow direction of the exhaust gas can be made small. For this reason, the pressure loss of the exhaust gas flow flowing to the turbine impeller 1 can be reduced, which will be specifically described. In many cases, a valve stroke angle of the flow passage switching valve 10 cannot be set at 90 degrees by restrictions of a position where the flow passage switching valve 10 is mounted, the actuator, and the like. In this regard, the valve stroke angle is a turning angle of the opening/closing valve 13 which is fully closed and which is fully opened to a maximum opening angle. Hence, even if the valve stroke angle of the flow passage switching valve 10 is less than 90 degrees, when the valve seat A is provided on a slant with respect to the flow velocity direction Z, the projected area of the opening/closing valve 13 when the flow passage switching valve 10 is opened can be made small.

Further, in the first embodiment, as shown in FIG. 2A, even when the opening/closing valve 13 is seated on the valve seat A, that is, when the flow passage switching valve 10 is fully closed, the flattened opening/closing valve 13 is slanted. For this reason, even when the flow passage switching valve 10 is fully closed, the exhaust gas on the exhaust upstream side of the opening/closing valve 13 can be smoothly guided to the first exhaust scroll 7. As a result, even when the flow passage switching valve 10 is fully closed, there can be produced an effect of reducing the pressure loss of the exhaust gas flow flowing into the first exhaust scroll 7.

Figure 8:
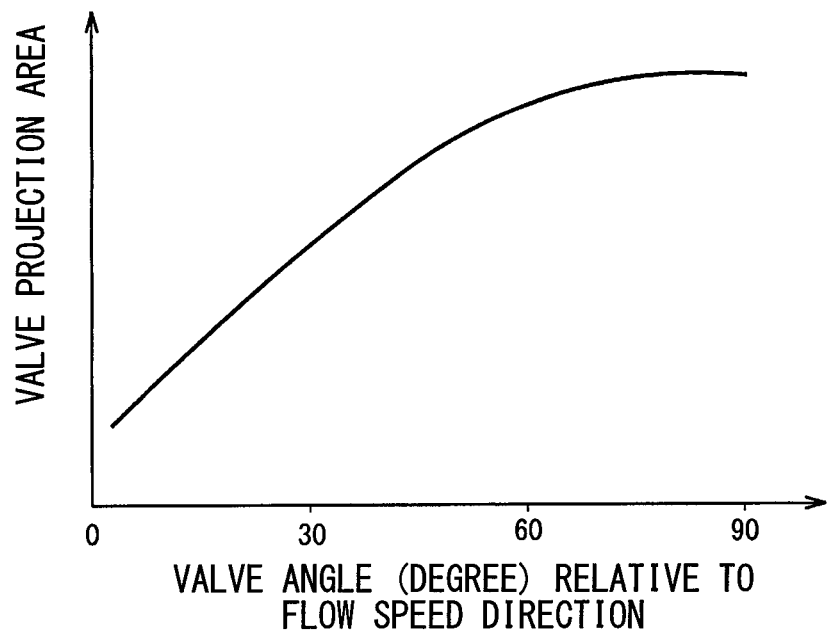
FIG. 8 is a graph to show a relationship between a valve angle with respect to a flow velocity direction and a projected area of the opening/closing valve in the first embodiment.

An effect 3 of the first embodiment will be described below. In the first embodiment, an inclination angle θ of the valve seat A with respect to the flow velocity direction Z is set to 60 degrees or less. Here, a relationship between "a valve angle of the opening/closing valve 13 with respect to the flow velocity direction Z" and "a projected area of the opening/closing valve 13 when viewed from the flow velocity direction Z", as shown in FIG. 8, is expressed by a sine function. In other words, "the projected area of the opening/closing valve 13 when viewed from the flow velocity direction Z" becomes small when "the valve angle of the opening/closing valve 13 with respect to the flow velocity direction Z" is not more than approximately 60 degrees.

Here, in the first embodiment, the inclination angle θ is made 60 degrees or less, so that even if an opening of the opening/closing valve 13 is a very small opening (for example, approximately 10 degrees), "the projected area of the opening/closing valve 13 when viewed from the flow velocity direction Z" can be made small. In other words, even if the valve opening of the opening/closing valve 13 is a very small opening, the projected area of the opening/closing valve 13 is made small, whereby the pressure loss of the exhaust gas flow can be reduced.

An effect 4 of the first embodiment will be described below. The flow passage switching hole 9 of the first embodiment is provided with a tapered surface β whose diameter is made larger toward the upstream side of the exhaust gas. The tapered surface β may be a conical face whose section is composed of straight lines or may be a tapered curved face whose section is composed of curved lines. In this regard, in a case where the tapered curved face is employed, it is desirable that a radius of curvature of the tapered curved face is large.

As a specific example of the tapered surface β, a conical face whose section is composed of straight lines is employed as the tapered surface β of the first embodiment. A spread angle of the tapered surface β is not limited to a special angle, but it is desired that the tapered surface β has a spread angle which is nearly parallel or more than parallel to the flow velocity direction Z. In this way, when the flow passage switching hole 9 is provided with the tapered surface β, even if the valve seat A is formed on a slant with respect to the flow velocity direction Z, it is possible to avoid a phenomenon such that the exhaust gas flowing into the flow passage switching hole 9 is separated from the flow passage switching hole 9.

This effect will be described in comparison with a case where the flow passage switching hole 9 is not provided with the tapered surface β. In the case where the flow passage switching hole 9 is not provided with the tapered surface β, an angle of an inside wall of the flow passage switching hole 9 with respect to the valve seat A is made 90 degrees. In this case, when the valve seat A is formed on a slant with respect to the flow velocity direction Z, in particular, at a position separate from the turning shaft 11, a curved angle of the exhaust gas becomes large before and after the valve seat A, which hence causes a phenomenon such that the exhaust gas is separated near the inside wall of the flow passage switching hole 9.

In contrast to this, when the flow passage switching hole 9 is provided with the tapered surface β, the flow of the exhaust gas at the inlet of the flow passage switching hole 9 can be made smooth. Specifically, when the flow passage switching hole 9 is provided with the tapered surface β, the flow of the exhaust gas at a position separate from the turning shaft 11 can be made nearly parallel to the flow velocity direction Z. This can prevent the phenomenon such that the exhaust gas is separated near the inside wall of the flow passage switching hole 9 to thereby reduce a pressure loss of the exhaust gas flow flowing into the second exhaust scroll 8.

In this first embodiment, as an example, the tapered surface β is formed by a cutting work. An axis of rotation of a cutting tool to cut the tapered surface β, as shown by a single dot and dash line in FIG. 2B, passes a center of the inlet of the flow passage switching hole 9 and is vertical to the valve seat A. For this reason, the tapered surface β is formed in a shape symmetrical with respect to the axis of rotation of the cutting tool. In this way, when the tapered surface β is formed by the cutting work, an exhaust upstream end of the tapered surface β opens at a suitable position of the valve seat A and in a perfect circle having a suitable diameter. This can improve a dimensional accuracy of an overlapping width of the valve seat A and the sealing surface B when the flow passage switching valve 10 is closed and hence can prevent the valve body 16 from being enlarged in its diameter size. In other words, it is possible to prevent the valve body 16 from being enlarged in size and hence to reduce the pressure loss of the exhaust gas flow.

The cutting work described above will be described in comparison with the other manufacturing technique. It can be thought that the tapered surface β is formed by a casting technique. In this case, a machining accuracy of the tapered surface β is made worse. Specifically, an opening accuracy of the tapered surface β with respect to the valve seat A is made worse. In this case, as a means for securing an overlapping dimension of the valve seat A and the sealing surface B, it is necessary to enlarge the diameter of the valve body 16. When the diameter of the valve body 16 is enlarged in this way, the pressure loss of the exhaust gas flow results in being increased. In this regard, in the first embodiment, the tapered surface β is formed by the cutting work but, of course, a machining method is not limited to the cutting work.

Figure 7A:
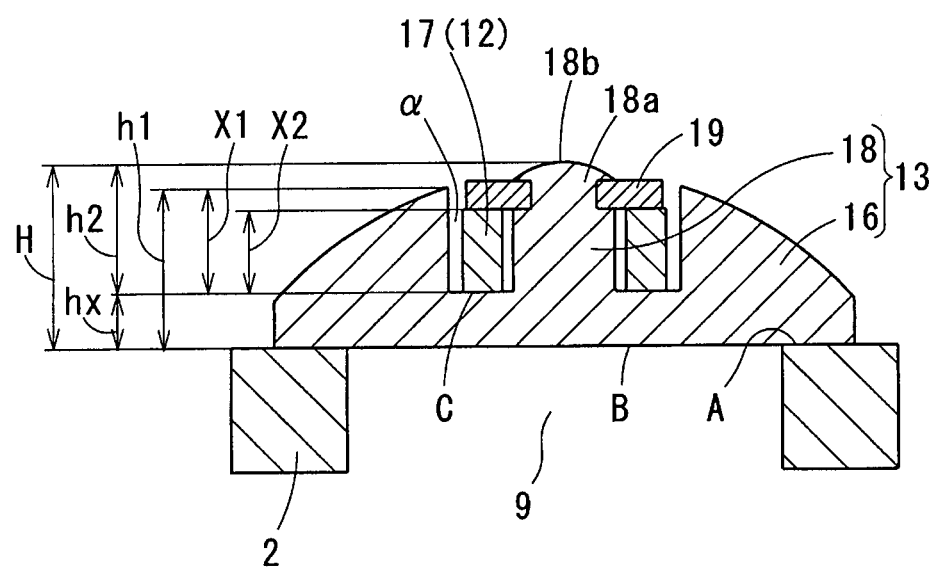
FIG. 7A is a figure to compare the opening/closing valve of the first embodiment with an opening/closing valve of a prior art and to show the opening/closing valve of the first embodiment.
Figure 7B:
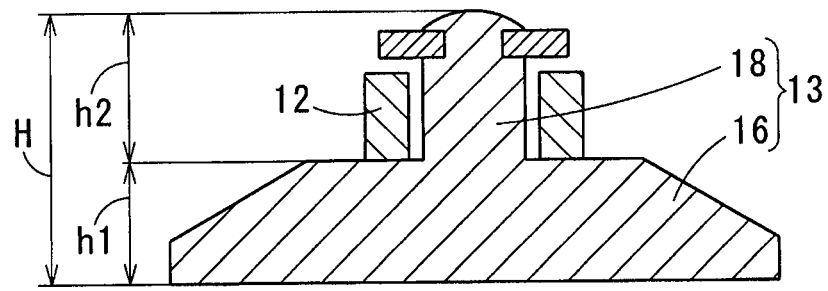
FIG. 7B is a figure to compare the opening/closing valve of the first embodiment with an opening/closing valve of a prior art and to show the opening/closing valve of the prior art.

An effect 5 of the first embodiment will be described below. In the valve body 16 of the first embodiment, as shown in FIG. 7A, a face on a side different from the sealing surface B is formed in a shape of a convex conical face or a convex spherical face. In other words, the valve body 16 has a thickness made thinner on an outer diameter side and gradually thicker toward a center side. As a specific example of the face on the side different from the sealing surface B, in the first embodiment, is employed the shape of the convex spherical face. In this regard, the shape of the convex spherical face is a spherical face to bulge out to the outside. When a top face of the valve body 16 is formed in the shape of the spherical face in this way, the exhaust gas flows smoothly along the surface of the valve body 16. As a result, it is possible to prevent the flow of the exhaust gas from being separated from the surface of the valve body 16 and hence to reduce the pressure loss of the exhaust gas flow when the flow passage switching valve 10 is opened.

Figure 5:
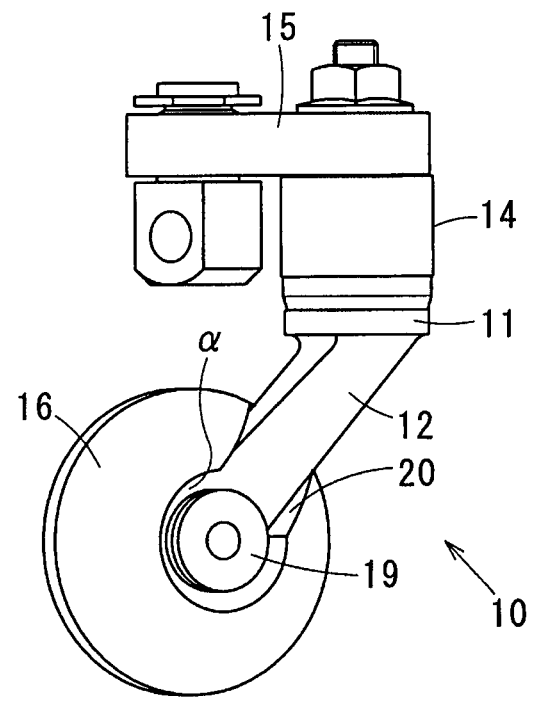
FIG. 5 is a figure to illustrate the flow passage switching valve when an opening/closing valve of the first embodiment is viewed from a slant direction.
Figure 6:
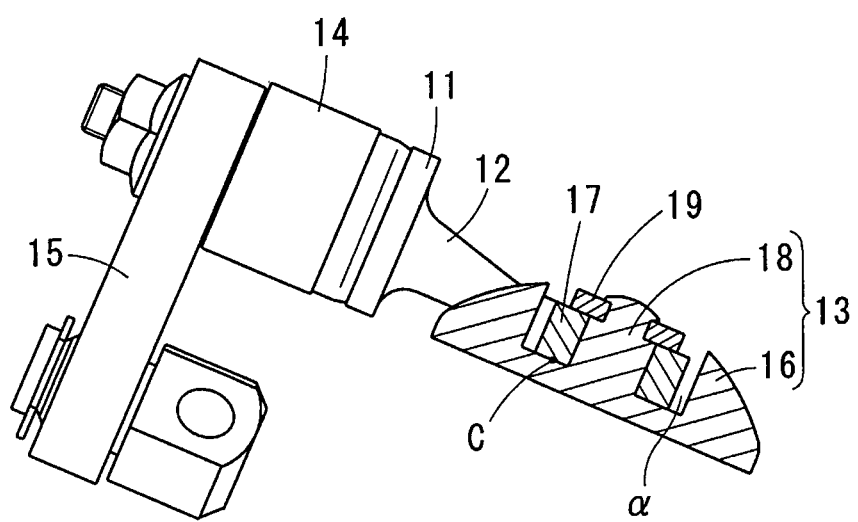
FIG. 6 is a figure to illustrate the flow passage switching valve in which the opening/closing valve of the first embodiment is shown in a section view.

An effect 6 of the first embodiment will be described below. In the valve body 16 of the first embodiment, as shown in FIG. 4 and FIG. 5, is formed an arm groove 20 into which the valve arm 12 is inserted and arranged. The arm groove 20 is a groove which extends from the arm inserted portion α to an outer diameter side and a clearance to allow the difference in thermal expansion between the valve arm 12 and the opening/closing valve 13 is formed between the arm groove 20 and the valve arm 12. When the arm groove 20 is formed in the valve body 16 and the valve arm 12 is received and arranged inside the arm groove 20 in this way, a rotation range of the valve body 16 with respect to the valve arm 12 is limited to within a narrow angle range. In other words, by inserting and arranging the valve arm 12 in the arm groove 20, it is possible to limit the rotation of the valve body 16 with respect to the valve arm 12.

When the valve body 16 is rotated with respect to the valve arm 12, the valve body 16 is likely to wear or chatter. Hence, in the first embodiment, the arm groove 20 is formed to thereby limit the rotation of the valve body 16 with respect to the valve arm 12, which hence can prevent the valve body 16 from wearing or chattering. Further, a portion to limit the rotation of the valve body 16 is not protruded to a portion in which the exhaust gas flows. For this reason, the portion to limit the rotation of the valve body 16 does not cause a malfunction to increase the pressure loss of the exhaust gas. In other words, it is possible to avoid a malfunction such that a portion to limit the rotation of the valve body 16 is protruded to the portion in which the exhaust gas flows to thereby cause the phenomenon such that the exhaust gas is separated from the surface of the valve body 16.

An effect 7 of the first embodiment will be described below. Here, as shown in FIG. 7A, it is assumed that a dimension of the arm inserted portion α in a thickness direction of the valve body 16 is X1 and that a dimension of the arm-side combined part 17 in the thickness direction of the valve body 16 is X2. Then, the flow passage switching valve 10 of the first embodiment is formed in such a way as to satisfy a relational expression of "X2<X1". In other words, the dimension X1 of the arm inserted portion α is made larger than the dimension X2 of the arm-side combined part 17.

In this way, the arm-side combined part 17 is provided in such a way as to be embedded in the valve body 16. In other words, the arm-side combined part 17 is provided in such a way as to be buried in the valve body 16. For this reason, as shown in FIG. 2B, the arm-side combined part 17 does not protrude from the top end of the valve body 16, which can hence reduce the pressure loss of the exhaust gas flow when the flow passage switching valve 10 is opened.

Second Embodiment

Figure 9:
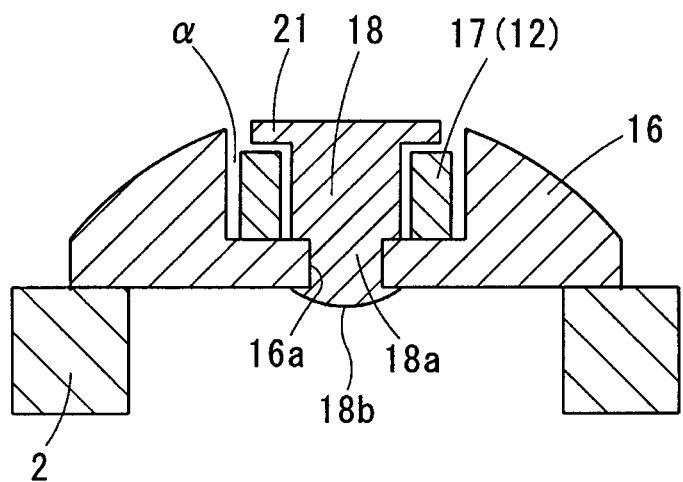
FIG. 9 is a section view of an opening/closing valve of a second embodiment.

A second embodiment will be described on the basis of FIG. 9. In this regard, in the following description, the same reference characters as in the first embodiment will denote the same functional parts. Further, in the following description, only parts changed with respect to the first embodiment will be disclosed and as for parts which will not be described in each of the following embodiments, embodiments which are described before will be employed. In the second embodiment, a valve-side combined part 18 formed in a shape of a shaft shaped like a circular column is provided as a part separate from the valve body 16 and is combined with the valve body 16.

As for a means for coupling the valve body 16 with the valve-side combined part 18 can be applied various kinds of techniques such as a welding technique and a swaging technique. The means is not limited to a special technique but a swaging technique is employed as a specific example. In a central portion of the valve body 16 is formed a through hole 16a which passes through the central portion in the vertical direction. Specifically, the through hole 16a is formed in the center of a cylindrical depression formed in the central portion of the valve body 16.

On the other hand, in a lower portion of the valve-side combined part 18 is formed a protruding shaft 18a which is inserted into the through hole 16a of the valve body 16 and which has a small diameter. Then, the protruding shaft 18a is inserted into the through hole 16a and a lower end of the protruding shaft 18a is swaged, whereby the valve-side combined part 18 is coupled with the valve body 16. In this regard, a swaged portion 18b is protruded down from a lower face of the valve body 16 but even when the flow passage switching valve 10 is closed, the swaged portion 18b exists inside the flow passage switching hole 9, which hence does not cause a malfunction such that the swaged portion 18b interferes with the turbine housing 2 and the like.

An effect 1 of the second embodiment will be described below. It is known that when the accuracy of a cylindrical surface of the valve-side combined part 18 inserted into the inside of the arm-side combined part 17 is increased, an effect of inhibiting the valve body 16 from chattering can be produced. Hence, when the valve-side combined part 18 is made as a separate part, the accuracy of the cylindrical surface of the valve-side combined part 18 can be comparatively easily increased. In other words, the accuracy of the cylindrical surface of the valve-side combined part 18 can be increased at a reduced cost.

An effect 2 of the second embodiment will be described below. In the first embodiment, the arm inserted portion α which is formed in a shape of a comparatively deep ring groove is formed in a top surface side of the valve body 16. For this reason, when the valve body 16 having the arm inserted portion α formed in the shape of the ring groove is formed by a cold forging technique, there is caused a malfunction to increase cost. In contrast to this, in the second embodiment is employed a construction such that the cylindrical depression is formed in the center of the valve body 16 and that the valve-side combined part 18 formed in the shape of a shaft is coupled in the cylindrical depression, whereby the arm inserted part α formed in the shape of the ring groove is formed around the valve-side combined part 18. For this reason, the valve body 16 can be easily formed by the cold forging technique, which hence can increase productivity and can reduce cost.

An effect 3 of the second embodiment will be described below. The valve-side combined part 18 of the second embodiment is integrally provided with a coming-off preventing flange 21 which prevents a tip portion of the valve arm 12 from coming off. The coming-off preventing flange 21 acts as a washer 19 shown in the first embodiment and can eliminate the washer 19 in the second embodiment. For this reason, the number of parts can be reduced and swaging or welding the valve-side combined part 18 to the washer 19 can be eliminated, which hence can increase productivity and can reduce cost.

In this regard, an outer diameter dimension of the coming-off preventing flange 21 is made larger than an inner diameter dimension of the arm-side combined part 17 formed in the shape of the cylinder. Further, as shown in FIG. 9, in a case where the outer diameter dimension of the coming-off preventing flange 21 is made smaller than an inner diameter dimension of the arm inserted portion α, it is desired that a portion or all of the coming-off preventing flange 21 is received inside the arm inserted portion α.

Third Embodiment

Figure 10:
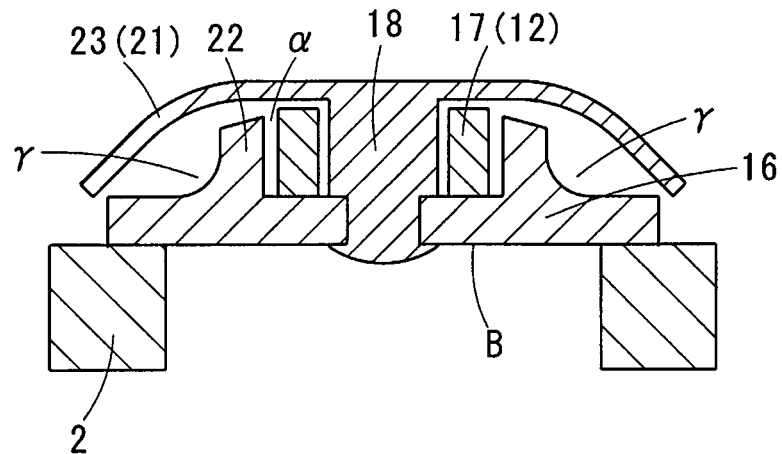
FIG. 10 is a section view of an opening/closing valve of a third embodiment.

A third embodiment will be described on the basis of FIG. 10. The valve body 16 of the third embodiment has a rib 22 provided on a side different from the sealing surface B, the rib 22 increasing the strength of the valve body 16. The rib 22 is formed by forming a thickness reduced portion γ on the top face of the valve body 16. The rib 22 is not limited in a shape and in the number of ribs but is provided in such a way that the valve body 16 is light and keeps a predetermined target strength. As a specific example, the rib 22, as shown in FIG. 10, may be provided in a shape of a ring or may be provided in a radial shape, which is different from FIG. 10, or may be provided in a shape of a combination of the ring and the radial shape.

An effect 1 of the third embodiment will be described below. Since the valve body 16 is provided with the rib 22, the strength of the valve body 16 can be held, and since the valve body 16 is provided with the thickness reduced portion γ to form the rib 22, the weight of the valve body 16 can be reduced and a material cost of the valve body 16 can be reduced. Further, since the weight of the valve body 16 can be reduced, an inertia weight of the valve body 16 when the valve body 16 is vibrated by an exhaust gas flow and a vehicle vibration can be reduced, which hence can reduce the wear and chattering of the valve body 16 which are caused by the valve body 16 being vibrated.

An effect 2 of the third embodiment will be described below. In the third embodiment, a face in which the rib 22 is formed in the valve body 16 is covered with a cover 23 formed in a convex conical shape or a convex spherical shape. In this regard, as is the case with the first embodiment, as a specific example is employed the convex spherical shape. When the cover 23 is provided on the top face of the valve body 16 to thereby cover the thickness reduced portion γ with the cover 23, the exhaust gas can smoothly flow along the surface of the cover 23. For this reason, it is possible to avoid a malfunction such that the flow of the exhaust gas is disturbed by the rib 22. In other words, the weight of the valve body 16 can be reduced by forming the rib 22 on the valve body 16 and the pressure loss of the exhaust gas flow when the flow passage switching valve 10 is opened can be reduced by the cover 23 provided on the top face of the valve body 16.

An effect 3 of the third embodiment will be described below. The cover 23 of the third embodiment doubles as the coming-off preventing flange 21 shown in the second embodiment and is integrally provided on a top end of the valve-side combined part 18. For this reason, the cover 23 does not need to be provided independently and hence an increase in the number of parts can be prevented. In other words, the cover 23 can be provided without increasing the number of parts.

Fourth Embodiment

Figure 11:
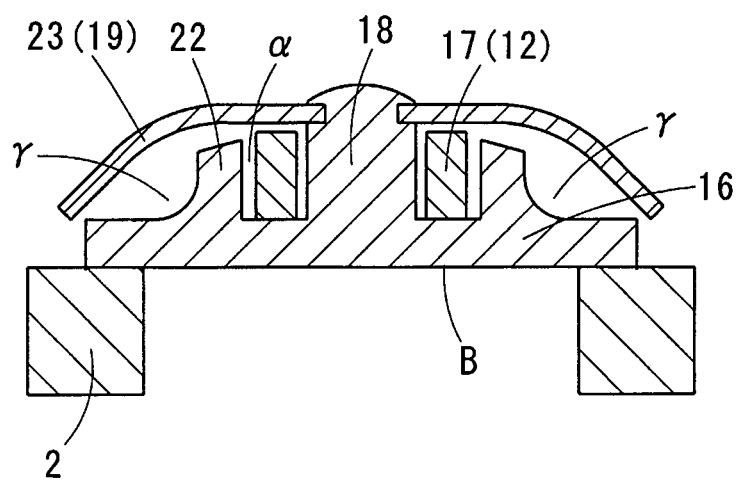
FIG. 11 is a section view of an opening/closing valve of a fourth embodiment.

A fourth embodiment will be described on the basis of FIG. 11. In the fourth embodiment, the valve body 16 shown in the first embodiment is provided with the rib 22 and the cover 23 to cover the top face of the valve body 16 provided with the rib 22 doubles as the washer 19. In this way, the washer 19 and the cover 23 are formed of one part, which can hence prevent an increase in the number of parts. In other words, the cover 23 can be provided without increasing the number of parts.

Fifth Embodiment

Figure 12:
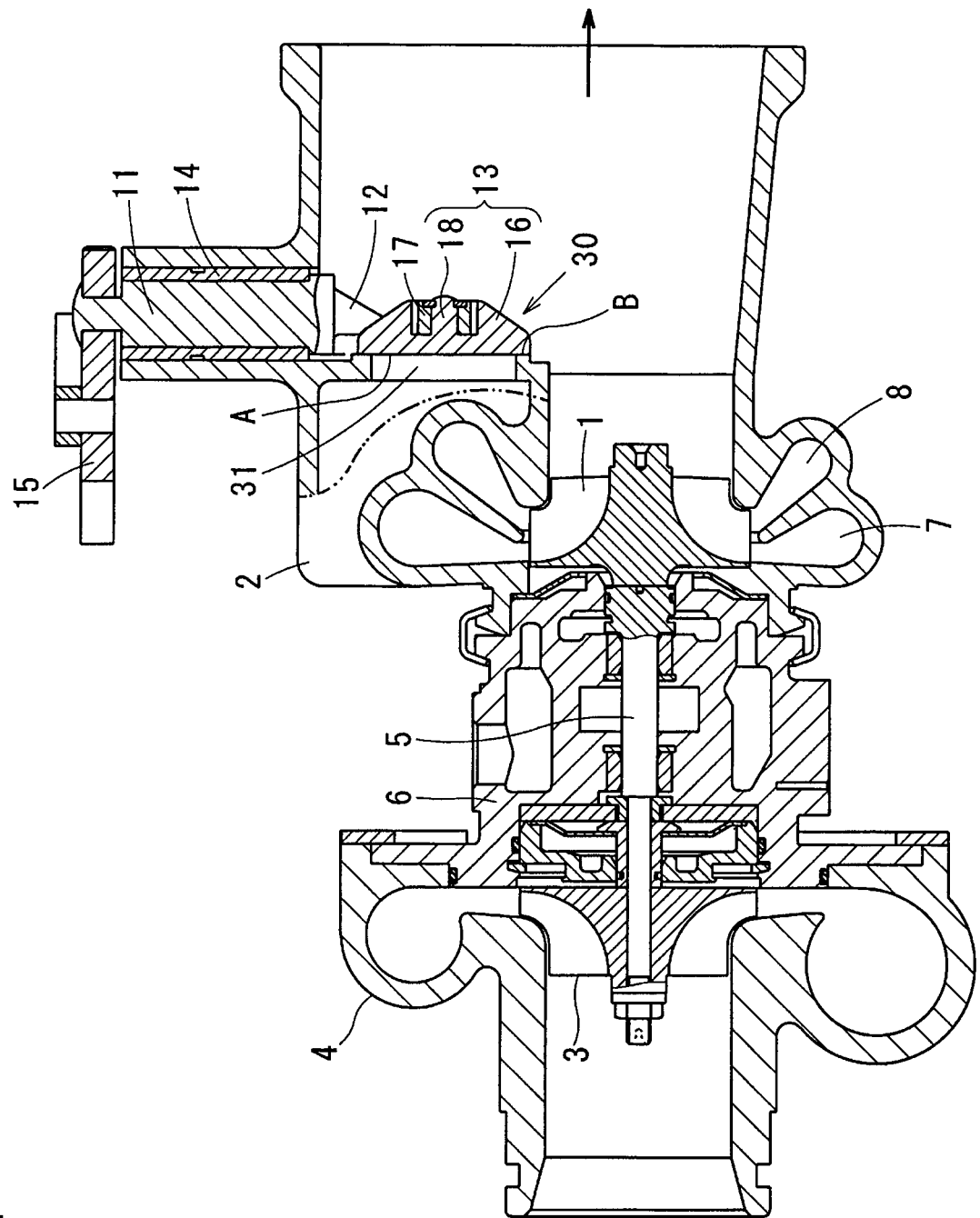
FIG. 12 is a section view of a turbocharger in which the present disclosure is applied to a west gate valve in a fifth embodiment.

A fifth embodiment will be described on the basis of FIG. 12. In the first embodiment to the fourth embodiment, examples have been shown in which the present disclosure is applied to the flow passage switching valve 10 of the turbocharger. In contrast to this, in the fifth embodiment, the present disclosure is applied to a west gate valve 30 of the turbocharger. In this regard, a bypass hole 31 which is opened or closed by the west gate valve 30 is an example of a passing hole.

The west gate valve 30 is a valve device which makes the exhaust gas on the exhaust upstream side of the turbine impeller 1 bypass the turbine impeller 1 to thereby guide the exhaust gas to a turbine downstream area. Specifically, the turbine housing 2 has the bypass hole 31 formed therein, the bypass hole 31 making the exhaust gas on the exhaust upstream side of the turbine impeller 1 bypass the turbine impeller 1 to thereby guide the exhaust gas to the turbine downstream area. Then, the bypass hole 31 is opened or closed by the west gate valve 30 to which the present disclosure is applied.

In this regard, main parts to construct the west gate valve 30 are the same as those to construct the flow passage switching valve 10 and are denoted in the drawings by the same reference characters as in the first embodiment and the descriptions of the main parts will be omitted. By applying the present disclosure to the west gate valve 30, it is possible to strengthen the valve body 16 to construct the west gate valve 30 and to flatten the opening/closing valve 13 at the same time. For this reason, the turbocharger can be reduced in size by the west gate valve 30 to which the present disclosure is applied.

An industrial applicability will be described below. In the embodiments described above, examples have been shown in which the present disclosure is applied to the flow passage switching valve 10 of the inward opening type, but the present disclosure may be applied to a flow passage switching valve 10 of an outward opening type. Also in this case, it is possible to strengthen the valve body 16 and to flatten the opening/closing valve 13 at the same time, so that the turbocharger can be reduced in size.

In the embodiments described above, examples have been shown in which the present disclosure is applied to the valve device used for the turbocharger, but the usage of the present disclosure is not limited to a special usage. Specifically, the present disclosure may be applied to other valve device to open or close a passing hole of the exhaust gas such as a switching valve of an EGR cooler and an exhaust bypass and an exhaust switching valve used for an exhaust heat recovery device.

Figure 13:
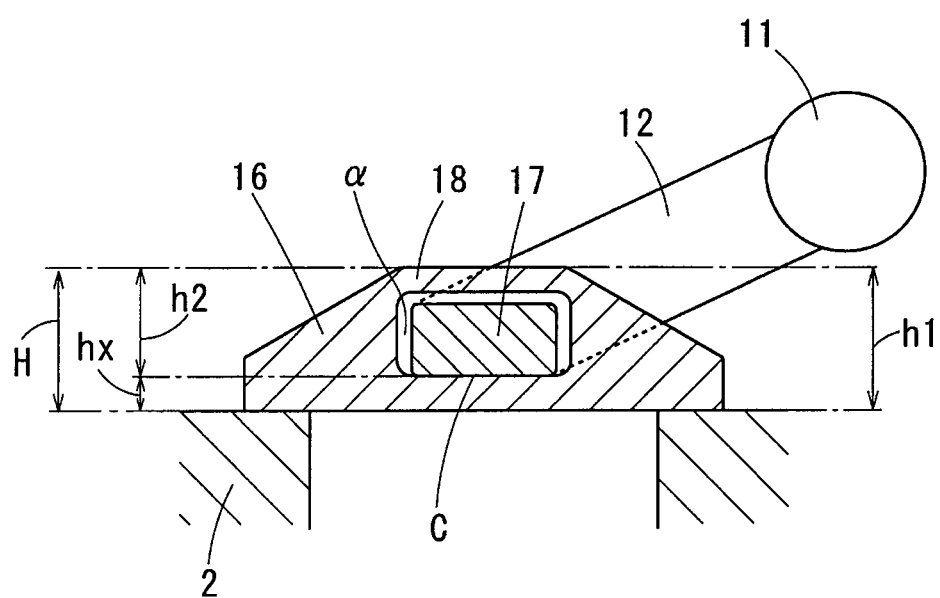
FIG. 13 is a section view of an opening/closing valve of a modification.

In the embodiments described above, the combining structure of the arm-side combined part 17 and the valve-side combined part 18 is not limited to the combining structure described above but can be suitably changed (for example, see FIG. 13).

In the embodiment described above, an example has been shown in which the arm inserted portion α is formed in the shape of the ring groove, but the shape of the arm inserted portion α is not limited to the shape of the ring groove. As a specific example, as shown in FIG. 13, the arm inserted portion α may be formed in a shape of a hole.

In the embodiment described above, the face on the side different from the sealing surface B of the valve body 16 is formed in the convex spherical shape, but it is not intended to limit the face to a spherical face. Specifically, as shown in FIG. 13, a convex nearly conical shape may be employed to thereby form the valve body 16 in a flat conical shape.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:
1. A valve device comprising:
a valve arm that is operated to rotate; and
an opening/closing valve that is supported by a tip of the valve arm and that opens or closes a passing hole for exhaust gas, wherein:
the opening/closing valve includes:
a valve body that is seated on a valve seat around the passing hole when the opening/closing valve closes the passing hole; and
a shaft-shaped valve-side combined part that is supported by the valve arm;
the valve body includes an arm inserted portion that accommodates a part of the valve arm;
a relation of hx<h1 is satisfied, provided that:
a surface of the valve body that is in contact with the valve seat when the opening/closing valve closes the passing hole is a sealing surface;
the valve arm and the opening/closing valve are in contact with each other on a contact surface when the opening/closing valve closes the passing hole;
a part of the contact surface that is the closest to the sealing surface is a valve-closed contact surface;
the valve body is formed by a convex conical shape or a convex spherical shape such that a top-most surface of the valve body is on an extreme opposite side from the sealing surface of the valve body and has a smaller cross-sectional surface area than a cross-sectional surface area of the sealing surface of the valve body;
hx is a size of thickness from the sealing surface to the valve-closed contact surface; and
h1 is a size of thickness of the valve body extending from the sealing surface of the valve body to the top-most surface of the valve body formed by the convex conical or spherical shape;
the valve device is of an inward opening type whereby the opening/closing valve moves toward an upstream side of the valve seat in a flow direction of exhaust gas, so that the opening/closing valve opens the passing hole;
provided that a flow direction of exhaust gas flowing through an opening/closing passage that is opened or closed by the opening/closing valve is a flow velocity direction, the valve seat is provided to be inclined relative to the flow velocity direction;
an inclination angle of the valve seat relative to the flow velocity direction is set to be larger than 0 degrees and 60 degrees or less;
a surface of the opening/closing valve that is cut along an axial direction of the shaft-shaped valve-side combined part has a continuous shape;
the valve body is a one-piece body capable of being engaged with the valve seat;
the flow velocity direction is a straight direction passing through the passing hole;
the opening/closing passage is provided side by side with a constantly-open passage through which the exhaust gas is constantly capable of passing so that the valve body controls the exhaust gas flow to the opening/closing passage and the constantly-open passage;
the valve body of the opening/closing valve is configured to close the passing hole so that the exhaust gas flows only through the constantly-open passage;

the valve body of the opening/closing valve is configured to open the passing hole so that the exhaust gas flows both into the constantly-open passage and into the opening/closing passage;
the one-piece body forming the valve body of the opening/closing valve includes only one sealing surface;
the valve arm includes an arm-side combined part supporting the shaft-shaped valve-side combined part at a tip of the valve arm; and
a relation X1>X2 is satisfied, provided that
X1 is a dimension of the arm inserted portion in a thickness direction of the valve body;
X2 is a dimension of the arm-side combined part in the thickness direction of the valve body.

2. The valve device according to claim 1, wherein a surface of the valve body on a different side from the sealing surface is formed in a convex conical shape or a convex spherical shape.

3. The valve device according to claim 1, wherein:
the dimension of the arm inserted portion in the thickness direction of the valve body extends within h1, which is the size of the thickness of the valve body extending from the sealing surface to the top-most surface of the valve body formed by the convex conical or spherical shape.

4. The valve device according to claim 1, wherein
h1 is the size of thickness of the valve body extending from the sealing surface of the valve body to the top-most surface of the valve body formed by the convex conical or spherical shape so that the top-most surface of the valve body extends above the top-most surface of the part of the valve arm accommodated in the arm inserted portion.

5. A valve device comprising:
a valve arm that is operated to rotate; and
an opening/closing valve that is supported by a tip of the valve arm and that opens or closes a passing hole for exhaust gas, wherein:
the opening/closing valve includes:
a valve body that is seated on a valve seat around the passing hole when the opening/closing valve closes the passing hole; and
a shaft-shaped valve-side combined part that is supported by the valve arm;
the valve body includes an arm inserted portion that accommodates a part of the valve arm;
a relation of hx<h1 is satisfied, provided that:
a surface of the valve body that is in contact with the valve seat when the opening/closing valve closes the passing hole is a sealing surface;
the valve arm and the opening/closing valve are in contact with each other on a contact surface when the opening/closing valve closes the passing hole;
a part of the contact surface that is the closest to the sealing surface is a valve-closed contact surface;
the valve body is formed by a convex conical shape or a convex spherical shape such that a top-most surface of the valve body is on an extreme opposite side from the sealing surface of the valve body and has a smaller cross-sectional surface area than a cross-sectional surface area of the sealing surface of the valve body;
hx is a size of thickness from the sealing surface to the valve-closed contact surface; and
h1 is a size of thickness of the valve body extending from the sealing surface of the valve body to the top-most surface of the valve body formed by the convex conical or spherical shape;
the valve device is of an inward opening type whereby the opening/closing valve moves toward an upstream side of the valve seat in a flow direction of exhaust gas, so that the opening/closing valve opens the passing hole;
provided that a flow direction of exhaust gas flowing through an opening/closing passage that is opened or closed by the opening/closing valve is a flow velocity direction, the valve seat is provided to be inclined relative to the flow velocity direction;
the passing hole has a tapered surface whose diameter increases toward the upstream side in the flow direction of exhaust gas;
a surface of the opening/closing valve that is cut along an axial direction of the shaft-shaped valve-side combined part has a continuous shape;
the valve body is a one-piece body capable of being engaged with the valve seat;
the opening/closing passage is provided side by side with a constantly-open passage through which the exhaust gas is constantly capable of passing so that the valve body controls the exhaust gas flow to the opening/closing passage and the constantly-open passage;
the valve body of the opening/closing valve is configured to close the passing hole so that exhaust gas flows only through the constantly-open passage;
the valve body of the opening/closing valve is configured to open the passing hole so that exhaust gas flows both into the constantly-open passage and into the opening/closing passage;
the one-piece body forming the valve body of the opening/closing valve includes only one sealing surface
the valve arm includes an arm-side combined part supporting the shaft-shaped valve-side combined part at a tip of the valve arm; and
a relation X1>X2 is satisfied, provided that
X1 is a dimension of the arm inserted portion in a thickness direction of the valve body;
X2 is a dimension of the arm-side combined part in the thickness direction of the valve body.

6. The valve device according to claim 5, wherein a surface of the valve body on a different side from the sealing surface is formed in a convex conical shape or a convex spherical shape.

7. The valve device according to claim 5, wherein:
the dimension of the arm inserted portion in the thickness direction of the valve body extends within h1, which is the size of the thickness of the valve body extending from the sealing surface to the top-most surface of the valve body formed by the convex conical or spherical shape.

8. The valve device according to claim 5, wherein
h1 is the size of thickness of the valve body extending from the sealing surface of the valve body to the top-most surface of the valve body formed by the convex conical or spherical shape so that the top-most surface of the valve body extends above the top-most surface of the part of the valve arm accommodated in the arm inserted portion.

9. A valve device comprising:
a valve arm that is operated to rotate; and
an opening/closing valve that is supported by a tip of the valve arm and that opens or closes a passing hole for exhaust gas, wherein:
the opening/closing valve includes:

a valve body that is seated on a valve seat around the passing hole when the opening/closing valve closes the passing hole; and a shaft-shaped valve-side combined part that is supported by the valve arm;

the valve body includes an arm inserted portion that accommodates a part of the valve arm;

a relation of hx<h1 is satisfied, provided that:

a surface of the valve body that is in contact with the valve seat when the opening/closing valve closes the passing hole is a sealing surface;

the valve arm and the opening/closing valve are in contact with each other on a contact surface when the opening/closing valve closes the passing hole;

a part of the contact surface that is the closest to the sealing surface is a valve-closed contact surface;

the valve body is formed by a convex conical shape or a convex spherical shape such that a top-most surface of the valve body is on an extreme opposite side from the sealing surface of the valve body and has a smaller cross-sectional surface area than a cross-sectional surface area of the sealing surface of the valve body;

hx is a size of thickness from the sealing surface to the valve-closed contact surface; and h1 is a size of thickness of the valve body extending from the sealing surface of the valve body to the top-most surface of the valve body formed by the convex conical or spherical shape;

the valve body includes an arm groove in which the valve arm is inserted and arranged;

the arm groove is provided on the valve body to extend radially outward;

the valve arm is inserted and arranged in the arm groove to restrict rotation of the valve body around an axis of the shaft-shaped valve-side combined part relative to the valve arm;

a surface of the opening/closing valve that is cut along an axial direction of the shaft-shaped valve-side combined part has a continuous shape;

the valve body is a one-piece body capable of being engaged with the valve seat;

an opening/closing passage is provided side by side with a constantly-open passage through which the exhaust gas is constantly capable of passing so that the valve body controls the exhaust gas flow to the opening/closing passage and the constantly-open passage;

the valve body of the opening/closing valve is configured to close the passing hole so that exhaust gas flows only through the constantly-open passage;

the valve body of the opening/closing valve is configured to open the passing hole so that exhaust gas flows both into the constantly-open passage and into the opening/closing passage;

the one-piece body forming the valve body of the opening/closing valve includes only one sealing surface;

the valve arm includes an arm-side combined part supporting the shaft-shaped valve-side combined part at a tip of the valve arm; and a relation X1>X2 is satisfied, provided that X1 is a dimension of the arm inserted portion in a thickness direction of the valve body;

X2 is a dimension of the arm-side combined part in the thickness direction of the valve body.

10. The valve device according to claim 9, wherein a surface of the valve body on a different side from the sealing surface is formed in a convex conical shape or a convex spherical shape.

11. The valve device according to claim 9, wherein:

the dimension of the arm inserted portion in the thickness direction of the valve body extends within h1, which is the size of the thickness of the valve body extending from the sealing surface to the top-most surface of the valve body formed by the convex conical or spherical shape.

12. The valve device according to claim 9, wherein h1 is the size of thickness of the valve body extending from the sealing surface of the valve body to the top-most surface of the valve body formed by the convex conical or spherical shape so that the top-most surface of the valve body extends above the top-most surface of the part of the valve arm accommodated in the arm inserted portion.

13. A valve device comprising:

a valve arm that is operated to rotate; and an opening/closing valve that is supported by a tip of the valve arm and that opens or closes a passing hole for exhaust gas, wherein:

the opening/closing valve includes:

a valve body that is seated on a valve seat around the passing hole when the opening/closing valve closes the passing hole; and a shaft-shaped valve-side combined part that is supported by the valve arm;

the valve body includes an arm inserted portion that accommodates a part of the valve arm;

a relation of hx<h1 is satisfied, provided that:

a surface of the valve body that is in contact with the valve seat when the opening/closing valve closes the passing hole is a sealing surface;

the valve arm and the opening/closing valve are in contact with each other on a contact surface when the opening/closing valve closes the passing hole;

a part of the contact surface that is the closest to the sealing surface is a valve-closed contact surface;

the valve body is formed by a convex conical shape or a convex spherical shape such that a top-most surface of the valve body is on an extreme opposite side from the sealing surface of the valve body and has a smaller cross-sectional surface area than a cross-sectional surface area of the sealing surface of the valve body;

hx is a size of thickness from the sealing surface to the valve-closed contact surface; and h1 is a size of thickness of the valve body extending from the sealing surface of the valve body to the top-most surface of the valve body formed by the convex conical or spherical shape;

the valve-side combined part is provided separately from the valve body;

the valve-side combined part is provided to be joined together with the valve body;

a surface of the opening/closing valve that is cut along an axial direction of the shaft-shaped valve-side combined part has a continuous shape;

the valve body is a one-piece body capable of being engaged with the valve seat;

an opening/closing passage is provided side by side with a constantly-open passage through which the exhaust gas is constantly capable of passing so that the valve body controls the exhaust gas flow to the opening/closing passage and the constantly-open passage;
the valve body of the opening/closing valve is configured to close the passing hole so that exhaust gas flows only through the constantly-open passage;
the valve body of the opening/closing valve is configured to open the passing hole so that exhaust gas flows both into the constantly-open passage and into the opening/closing passage;
the one-piece body forming the valve body of the opening/closing valve includes only one sealing surface;
a relation X1>X2 is satisfied, provided that
X1 is a dimension of the arm inserted portion in a thickness direction of the valve body;
X2 is a dimension of the arm-side combined part in the thickness direction of the valve body.

14. The valve device according to claim 13, wherein a surface of the valve body on a different side from the sealing surface is formed in a convex conical shape or a convex spherical shape.

15. The valve device according to claim 13, wherein:
the dimension of the arm inserted portion in the thickness direction of the valve body extends within h1, which is the size of the thickness of the valve body extending from the sealing surface to the top-most surface of the valve body formed by the convex conical or spherical shape.

16. The valve device according to claim 13, wherein
h1 is the size of thickness of the valve body extending from the sealing surface of the valve body to the top-most surface of the valve body formed by the convex conical or spherical shape so that the top-most surface of the valve body extends above the top-most surface of the part of the valve arm accommodated in the arm inserted portion.

17. A valve device comprising:
a valve arm that is operated to rotate; and
an opening/closing valve that is supported by a tip of the valve arm and that opens or closes a passing hole for exhaust gas, wherein:
the opening/closing valve includes:
a valve body that is seated on a valve seat around the passing hole when the opening/closing valve closes the passing hole; and
a shaft-shaped valve-side combined part that is supported by the valve arm;
the valve body includes an arm inserted portion that accommodates a part of the valve arm;
a relation of hx<h1 is satisfied, provided that:
a surface of the valve body that is in contact with the valve seat when the opening/closing valve closes the passing hole is a sealing surface;
the valve arm and the opening/closing valve are in contact with each other on a contact surface when the opening/closing valve closes the passing hole;
a part of the contact surface that is the closest to the sealing surface is a valve-closed contact surface;
the valve body is formed by a convex conical shape or a convex spherical shape such that a top-most surface of the valve body is on an extreme opposite side from the sealing surface of the valve body and has a smaller cross-sectional surface area than a cross-sectional surface area of the sealing surface of the valve body;
hx is a size of thickness from the sealing surface to the valve-closed contact surface; and
h1 is a size of thickness of the valve body extending from the sealing surface of the valve body to the top-most surface of the valve body formed by the convex conical or spherical shape;
the valve-side combined part is provided integrally with a coming-off preventing flange that prevents a tip portion of the valve arm from coming off;
a surface of the opening/closing valve that is cut along an axial direction of the shaft-shaped valve-side combined part has a continuous shape;
the valve body is a one-piece body capable of being engaged with the valve seat;
an opening/closing passage is provided side by side with a constantly-open passage through which the exhaust gas is constantly capable of passing so that the valve body controls the exhaust gas flow to the opening/closing passage and the constantly-open passage;
the valve body of the opening/closing valve is configured to close the passing hole so that the exhaust gas flows only through the constantly-open passage;
the valve body of the opening/closing valve is configured to open the passing hole so that the exhaust gas flows both into the constantly-open passage and into the opening/closing passage;
the one-piece body forming the valve body of the opening/closing valve includes only one sealing surface;
a relation X1>X2 is satisfied, provided that
X1 is a dimension of the arm inserted portion in a thickness direction of the valve body;
X2 is a dimension of the arm-side combined part in the thickness direction of the valve body.

18. The valve device according to claim 17, wherein a surface of the valve body on a different side from the sealing surface is formed in a convex conical shape or a convex spherical shape.

19. The valve device according to claim 17, wherein:
the dimension of the arm inserted portion in the thickness direction of the valve body extends within h1, which is the size of the thickness of the valve body extending from the sealing surface to the top-most surface of the valve body formed by the convex conical or spherical shape.

20. The valve device according to claim 17, wherein
h1 is the size of thickness of the valve body extending from the sealing surface of the valve body to the top-most surface of the valve body formed by the convex conical or spherical shape so that the top-most surface of the valve body extends above the top-most surface of the part of the valve arm accommodated in the arm inserted portion.

21. A valve device comprising:
a valve arm that is operated to rotate; and
an opening/closing valve that is supported by a tip of the valve arm and that opens or closes a passing hole for exhaust gas, wherein:
the opening/closing valve includes:
a valve body that is seated on a valve seat around the passing hole when the opening/closing valve closes the passing hole; and
a shaft-shaped valve-side combined part that is supported by the valve arm;
the valve body includes an arm inserted portion that accommodates a part of the valve arm;
a relation of hx<h1 is satisfied, provided that:
a surface of the valve body that is in contact with the valve seat when the opening/closing valve closes the passing hole is a sealing surface;

the valve arm and the opening/closing valve are in contact with each other on a contact surface when the opening/closing valve closes the passing hole;

a part of the contact surface that is the closest to the sealing surface is a valve-closed contact surface;

the valve body is formed by a convex conical shape or a convex spherical shape such that a top-most surface of the valve body is on an extreme opposite side from the sealing surface of the valve body and has a smaller cross-sectional surface area than a cross-sectional surface area of the sealing surface of the valve body;

hx is a size of thickness from the sealing surface to the valve-closed contact surface; and h1 is a size of thickness of the valve body extending from the sealing surface of the valve body to the top-most surface of the valve body formed by the convex conical or spherical shape;

the valve body includes a rib that increases strength of the valve body on a different side from the sealing surface, the valve device further comprising a convex cover having a generally conical shape, wherein a surface of the valve body where the rib is formed is covered with the cover;

a surface of the opening/closing valve that is cut along an axial direction of the shaft-shaped valve-side combined part has a continuous shape;

the valve body is a one-piece body capable of being engaged with the valve seat;

an opening/closing passage is provided side by side with a constantly-open passage through which the exhaust gas is constantly capable of passing so that the valve body controls the exhaust gas flow to the opening/closing passage and the constantly-open passage;

the valve body of the opening/closing valve is configured to close the passing hole so that the exhaust gas flows only through the constantly-open passage;

the valve body of the opening/closing valve is configured to open the passing hole so that the exhaust gas flows both into the constantly-open passage and into the opening/closing passage;

the one-piece body forming the valve body of the opening/closing valve includes only one sealing surface;

a relation $X1>X2$ is satisfied, provided that
  $X1$ is a dimension of the arm inserted portion in a thickness direction of the valve body;
  $X2$ is a dimension of the arm-side combined part in the thickness direction of the valve body.

22. The valve device according to claim 21, wherein a surface of the valve body on a different side from the sealing surface is formed in a convex conical shape or a convex spherical shape.

23. The valve device according to claim 21, wherein:
the dimension of the arm inserted portion in the thickness direction of the valve body extends within h1, which is the size of the thickness of the valve body extending from the sealing surface to the top-most surface of the valve body formed by the convex conical or spherical shape.

24. The valve device according to claim 21, wherein h1 is the size of thickness of the valve body extending from the sealing surface of the valve body to the top-most surface of the valve body formed by the convex conical or spherical shape so that the top-most surface of the valve body extends above the top-most surface of the part of the valve arm accommodated in the arm inserted portion.

* * * * *